(12) United States Patent
Kim et al.

(10) Patent No.: US 12,397,289 B2
(45) Date of Patent: Aug. 26, 2025

(54) MULTIPLE TIMES AVAILABLE DRUG CONCENTRATION MEASURING APPARATUS AND METHOD

(71) Applicant: KOREA ELECTRONICS TECHNOLOGY INSTITUTE, Seongnam-si (KR)

(72) Inventors: Kun Nyun Kim, Yongin-si (KR); Yeon Hwa Kwak, Seoul (KR); Min Ji Jeon, Daegu (KR); Mun Bae Jeon, Seongnam-si (KR)

(73) Assignee: KOREA ELECTRONICS TECHNOLOGY INSTITUTE, Seongnam-si (KR)

( * ) Notice: Subject to any disclaimer, the term of this patent is extended or adjusted under 35 U.S.C. 154(b) by 852 days.

(21) Appl. No.: 17/132,408

(22) Filed: Dec. 23, 2020

(65) Prior Publication Data
US 2021/0245154 A1 Aug. 12, 2021

(30) Foreign Application Priority Data
Feb. 11, 2020 (KR) .................. 10-2020-0016542

(51) Int. Cl.
*B01L 3/00* (2006.01)
(52) U.S. Cl.
CPC .......... *B01L 3/502715* (2013.01); *B01L 2200/0605* (2013.01); *B01L 2300/0663* (2013.01);
(Continued)
(58) Field of Classification Search
None
See application file for complete search history.

(56) References Cited

U.S. PATENT DOCUMENTS

| 7,647,190 B2 * | 1/2010 | Uemura | G16Z 99/00 |
| | | | 702/30 |
| 2013/0189708 A1 * | 7/2013 | Shiba | G01N 35/026 |
| | | | 422/69 |

(Continued)

FOREIGN PATENT DOCUMENTS

| KR | 1995-0010395 B1 | 9/1995 |
| KR | 1999-015344 A | 3/1999 |

(Continued)

OTHER PUBLICATIONS

Reizman, Brandon J., and Klavs F. Jensen. "Simultaneous solvent screening and reaction optimization in microliter slugs." Chemical Communications 51, No. 68 (2015): 13290-13293. (26 pages) (Year: 2015).*

(Continued)

*Primary Examiner* — Bao-Thuy L Nguyen
(74) *Attorney, Agent, or Firm* — Hauptman Ham, LLP

(57) ABSTRACT

A multiple times available drug concentration measuring apparatus includes a sample input unit configured to allow a liquid drug sample to be introduced therethrough, a dilution unit configured to add a solvent to a portion of the liquid drug sample in order to dilute the liquid drug sample, a concentration measurement unit configured to measure the concentration of the liquid drug sample using a sensor, and a control unit configured to decide a dilution ratio of the liquid drug sample based on data received from the concentration measurement unit, to perform control such that the dilution unit dilutes the liquid drug sample according to the dilution ratio, and to calculate the concentration of the liquid drug sample based on the dilution ratio and the data received from the concentration measurement unit.

4 Claims, 9 Drawing Sheets

(52) U.S. Cl.
CPC ............... *B01L 2300/0672* (2013.01); *B01L 2300/0816* (2013.01)

(56) References Cited

U.S. PATENT DOCUMENTS

2014/0094391 A1* 4/2014 McDevitt .............. B01L 3/5027
600/572
2018/0305754 A1 10/2018 Im

FOREIGN PATENT DOCUMENTS

| KR | 10-2017-0009153 A | 1/2017 |
|---|---|---|
| KR | 10-1723826 B1 | 4/2017 |

OTHER PUBLICATIONS

Smith, R.-K. (2019). Chapter 7-Calibrations. In Water and Wastewater Laboratory Techniques (2nd ed., pp. 111-130). Water Environment Federation. (Year: 2019).*

Korean Office Action issued on May 6, 2021, in connection with the Korean Patent Application No. 10-2020-0016542 citing the above reference(s).

* cited by examiner

MULTIPLE TIMES AVAILABLE DRUG CONCENTRATION MEASURING APPARATUS AND METHOD

CROSS REFERENCE TO RELATED APPLICATION

The present application claims priority to Korean Patent Application No. 10-2020-0016542, filed Feb. 11, 2020, the entire contents of which is incorporated herein for all purposes by this reference.

BACKGROUND OF THE INVENTION

Field of the Invention

The present invention relates to a multiple times available drug concentration measuring apparatus and method.

Description of the Related Art

Drug criminal cases, which threaten safety of people, frequently occur, and various drug sensors are used in order to prevent drug criminal cases and to increase a crime arrest rate. In addition, there is a need for a drug inspection apparatus or method that is convenient to use, inexpensive, and market friendly in an environment in which drug crimes are propagated into daily lives of people due to development of social media.

There are various types of drug sensors that can be used during criminal investigation at the scene; however, a sensor capable of rapidly detecting the presence of drugs for the purpose of screening is generally used. However, drugs vary from each other in terms of kind, delivery method, state of a taker, etc. depending on scene situation. As a result, samples have different concentrations. In addition, samples are dissolved in an arbitrary liquid solvent, such as alcohol, food and beverage, sweat, or urine. Such samples increase errors in drug inspection instruments and sensors and impede efficient criminal investigation.

RELATED ART DOCUMENTS

Patent Documents (Patent Document 1) KR 10-1723826 B1
(Patent Document 2) KR 1995-0010395 B1
(Patent Document 3) KR 1999-015344 A

SUMMARY OF THE INVENTION

It is an object of the present invention to efficiently measure the concentration of a liquid drug sample, which has an arbitrary concentration.

It is another object of the present invention to provide a concentration measuring apparatus and method, wherein, when a sensor measures the concentration of a liquid drug sample, which has an arbitrary concentration, in the case in which the concentration of the liquid drug sample exceeds the upper limit of a concentration range that can be measured by the sensor, the liquid drug sample is repeatedly diluted and the concentration of the liquid drug sample is remeasured, whereby it is possible to backwardly calculate the original concentration of the liquid drug sample before dilution.

It is a further object of the present invention to provide a concentration measuring apparatus and method, wherein a plurality of sensors is disposed in a replaceable cartridge, the sensors are repeatedly tested to learn a concentration range that can be measured by the sensors, and concentration is efficiently measured depending on the number of times that the cartridge is used.

In accordance with an aspect of the present invention, the above and other objects can be accomplished by the provision of a multiple times available drug concentration measuring apparatus including a sample input unit configured to allow a liquid drug sample to be introduced therethrough, a dilution unit configured to add a solvent to a portion of the liquid drug sample in order to dilute the liquid drug sample, a concentration measurement unit configured to measure the concentration of the liquid drug sample using a sensor, and a control unit configured to decide a dilution ratio of the liquid drug sample based on data received from the concentration measurement unit, to perform control such that the dilution unit dilutes the liquid drug sample according to the dilution ratio, and to calculate the concentration of the liquid drug sample based on the dilution ratio and the data received from the concentration measurement unit.

The multiple times available drug concentration measuring apparatus may further include a kind determination unit configured to receive the liquid drug sample from the dilution unit and to determine the kind of a drug, wherein the control unit may further perform control such that the dilution unit selects a solvent to dilute the liquid drug sample based on the kind of the drug in the liquid drug sample determined by the kind determination unit.

The concentration measurement unit may expose a predetermined amount of the liquid drug sample to a predetermined sensor, among a plurality of sensors disposed in a replaceable cartridge, may operate the sensor, and may provide data output by the sensor to the control unit.

The dilution unit may include a base chamber configured to store the liquid drug sample received from the sample input unit, a plurality of dilution chambers configured respectively to store liquid drug samples diluted at various ratios as the result of a portion of the liquid drug sample received from the base chamber being repeatedly diluted with the solvent according to the dilution ratio, a plurality of solvent tanks configured respectively to store various kinds of solvents, and a quantitative pipe configured to connect the base chamber, the dilution chambers, and the solvent tanks to each other and to transmit the liquid drug samples and the solvents in predetermined amounts.

Upon determining based on the data received from the concentration measurement unit that the concentration of the liquid drug sample exposed to the sensor exceeds the upper limit of a concentration range that can be measured by the sensor, the control unit may perform control such that the dilution unit repeatedly dilutes the liquid drug sample exposed to the sensor, may transmit the repeatedly diluted liquid drug sample to the concentration measurement unit such that the concentration of the liquid drug sample is repeatedly measured, and may calculate the concentration of the liquid drug that has not been diluted using a dilution ratio obtained as the result of repeated dilution.

The control unit may perform control such that the dilution unit dilutes a standard sample so as to have various concentrations, may expose standard samples diluted so as to have various concentrations to sensors to analyze output values of the sensors, and may learn the upper limit of the concentration range that can be measured by the sensors.

In accordance with another aspect of the present invention, there is provided a multiple times available drug concentration measuring method including a sample introduction step of storing a liquid drug sample injected through a sample input unit in a dilution unit, a kind determination step of determining the kind of a drug in the liquid drug sample, a solvent introduction step of introducing a solvent selected based on the determined kind of the drug into the liquid drug sample according to a predetermined dilution ratio in order to dilute the liquid drug sample, a sensor operation step of exposing the liquid drug sample to a sensor to acquire an output value of the sensor, a high-concentration determination step of determining whether the concentration of the liquid drug sample calculated based on the output value of the sensor exceeds the upper limit of a concentration range that can be measured by the sensor, a dilution ratio decision step of deciding a dilution ratio necessary to repeat dilution by performing the solvent introduction step and subsequent steps again in the case in which the concentration of the liquid drug sample exceeds the upper limit, and a concentration calculation step of calculating the concentration of the liquid drug sample before dilution using the dilution ratio in the case in which the concentration of the liquid drug sample does not exceed the upper limit.

The sensor operation step may include a sensor output recognition step of the liquid drug sample being exposed to the sensor and a control unit recognizing the output value of the sensor, a sensor use recording step of recording that the sensor providing the output value has been used, and a cartridge residual quantity display step of displaying the number of unused sensors in a cartridge, in which a plurality of sensors is disposed, to inform of a replacement cycle of the cartridge.

The multiple times available drug concentration measuring method may further include a concentration range recognition step of recognizing the upper limit of the concentration range that can be measured by the sensor using a standard sample, wherein the concentration range recognition step may include a standard sample introduction step of storing the standard sample injected through the sample input unit in the dilution unit, a sample concentration diversification step of introducing a solvent into the standard sample according to various dilution ratios to generate standard samples having various concentrations, a sensor test operation step of exposing the standard samples to a plurality of sensors to acquire output values of the plurality of sensors, and a critical value recognition step of comparing the output values of the sensors that have measured the standard samples having different concentrations, among the plurality of sensors, with each other to recognize a concentration at which the sensors are not saturated.

The critical value recognition step may include a first output comparison step of comparing an output value of a first sensor that has measured a standard sample having a first highest concentration and an output value of a second sensor that has measured a standard sample having a second highest concentration with each other, a second output comparison step of comparing the output value of the second sensor that has measured the standard sample having the second highest concentration and an output value of a third sensor that has measured a standard sample having a third highest concentration with each other, among the plurality of sensors, a sample concentration resetting step of determining that the sensors are saturated in the case in which the output values are equal to each other as the result of performing the first output comparison step or the second output comparison step and resetting the concentration of the standard sample so as to have a lower concentration, and an upper limit decision step of recognizing the concentration of the standard sample exposed to the sensor having the lower output value as the result of performing the first output comparison step or the second output comparison step as the upper limit of the concentration range that can be measured by the sensors.

The upper limit decision step may include a concentration subdivision decision step of selecting two sensors from among sensors that have output different output values in order of a higher concentration to a lower concentration of the standard samples and subdividing the concentrations of the standard samples within the concentration range of the two standard samples exposed to the selected two sensors, a subdivided sample generation step of introducing the solvent into the standard samples according to the subdivided concentrations of the standard samples to generate standard samples having subdivided concentrations, a subdivided data acquisition step of exposing the standard samples having subdivided concentrations to the plurality of sensors to acquire output values of the plurality of sensors, and a learning step of learning the upper limit of the concentration range that can be measured by the sensors using a function between the output values acquired in the subdivided data acquisition step and the subdivided concentrations of the standard samples.

The features and advantages of the present invention will be more clearly understood from the following detailed description taken in conjunction with the accompanying drawings.

It should be understood that the terms used in the specification and appended claims should not be construed as being limited to general and dictionary meanings, but should be construed based on meanings and concepts according to the spirit of the present invention on the basis of the principle that the inventor is permitted to define appropriate terms for the best explanation.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
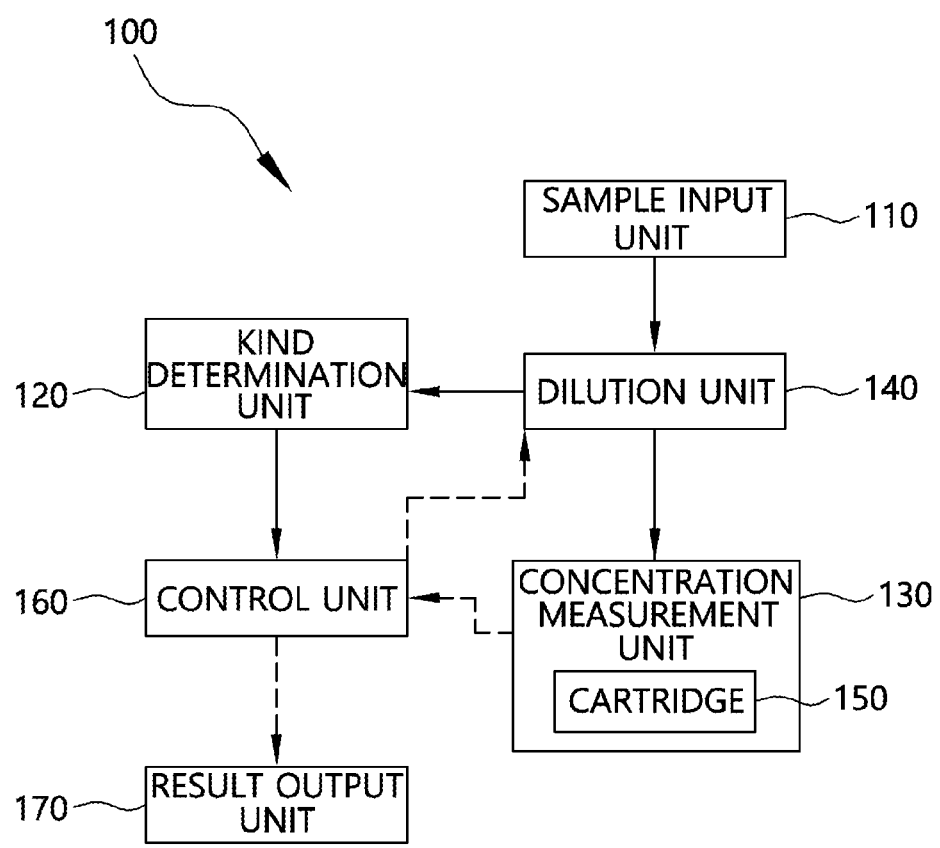
FIG. 1 is a block diagram showing a multiple times available drug concentration measuring apparatus according to an embodiment of the present invention.

Objects, specific advantages, and novel features of the present invention will be apparent from exemplary embodiments and the following detailed description in connection with the accompanying drawings. It should be noted that, when reference numerals are assigned to the elements of the drawings, the same reference numeral is assigned to the same elements even when they are illustrated in different drawings. In addition, the terms "one surface", "the other surface", "first", "second", etc. are used to distinguish one element from another, and elements are not limited by the terms. In the following description of embodiments of the present invention, a detailed description of related known technology will be omitted when the same may obscure the subject matter of the embodiments of the present invention.

Hereinafter, embodiments of the present invention will be described in detail with reference to the accompanying drawings.

FIG. 1 is a block diagram showing a multiple times available drug concentration measuring apparatus 100 according to an embodiment of the present invention.

As shown in FIG. 1, the multiple times available drug concentration measuring apparatus 100 according to the embodiment of the present invention may include a sample input unit 110 configured to allow a liquid drug sample to be introduced therethrough, a dilution unit 140 configured to add a solvent to a portion of the liquid drug sample in order to dilute the liquid drug sample, a concentration measurement unit 130 configured to measure the concentration of the liquid drug sample using a sensor 151, and a control unit 160 configured to decide a dilution ratio of the liquid drug sample based on data received from the concentration measurement unit 130, to perform control such that the dilution unit 140 dilutes the liquid drug sample according to the dilution ratio, and to calculate concentration of the liquid drug sample based on the dilution ratio and the data received from the concentration measurement unit 130.

When an arbitrary liquid drug sample is collected at the scene of a criminal or accident investigation, the multiple times available drug concentration measuring apparatus 100 according to the embodiment of the present invention is capable of measuring the kind and concentration of drugs included in the liquid drug sample.

The liquid drug sample includes a substance containing a drug that may be acquired at the scene of a drug crime or accident. The liquid drug sample includes various kinds of substances, such as blood, excreta, sweat, food, drink, and liquor, containing a drug.

The sample input unit 110 includes a structure configured to allow a liquid drug sample to be injected into the multiple times available drug concentration measuring apparatus 100 from the outside therethrough. The sample input unit 110 may be manufactured in a replaceable throwaway form in order to prevent contamination of a sample and to guarantee accuracy in inspection. The arbitrary liquid drug sample introduced through the sample input unit 110 is transmitted to the dilution unit 140.

The dilution unit 140 may add a solvent to a portion of the liquid drug sample to dilute the liquid drug sample so as to have a predetermined concentration.

Figure 2:
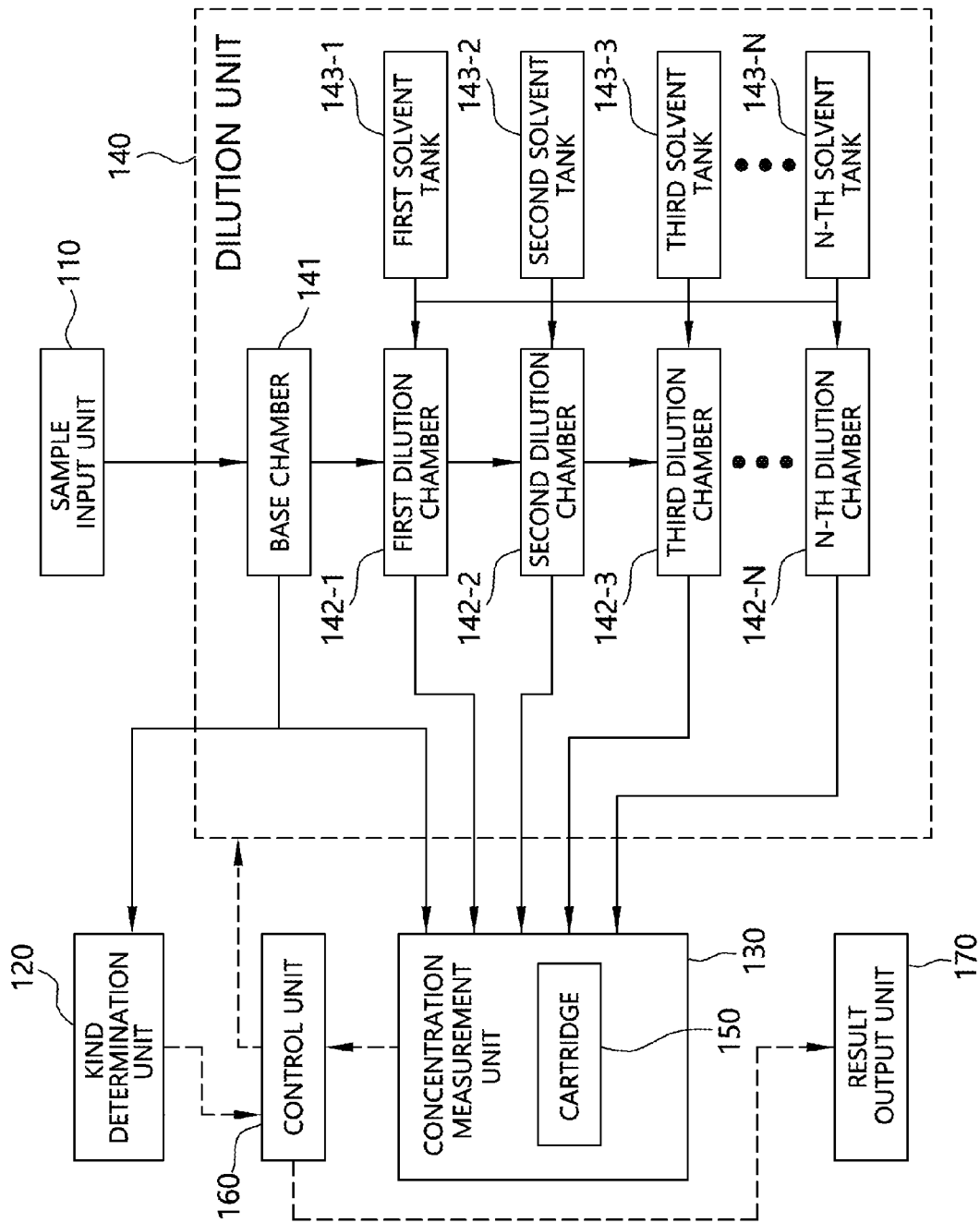
FIG. 2 is a block diagram showing in detail the construction of a dilution unit in the multiple times available drug concentration measuring apparatus according to the embodiment of the present invention.

FIG. 2 is a block diagram showing in detail the construction of the dilution unit 140 in the multiple times available drug concentration measuring apparatus 100 according to the embodiment of the present invention.

As shown in FIG. 2, the dilution unit 140 may include a base chamber 141 configured to store the liquid drug sample received from the sample input unit 110, a plurality of dilution chambers 142 configured respectively to store liquid drug samples diluted at various ratios as the result of a portion of the liquid drug sample received from the base chamber 141 being repeatedly diluted with the solvent according to the dilution ratio, a plurality of solvent tanks 143 configured respectively to store various kinds of solvents, and a quantitative pipe (indicated by solid arrows in FIG. 2) configured to connect the base chamber 141, the dilution chambers 142, and the solvent tanks 143 to each other and to transmit the liquid drug samples and the solvents in predetermined amounts.

The base chamber 141 may temporarily store the arbitrary liquid drug sample introduced from the outside through the sample input unit 110. The base chamber 141 may transmit the liquid drug sample to a kind determination unit 120 or the dilution chambers 142 via the quantitative pipe.

The dilution chamber 142 may add a solvent to the liquid drug sample to dilute the liquid drug sample and may store the diluted liquid drug sample. A plurality of dilution chambers 142 may be provided. The plurality of dilution chambers 142 may be referred to as a first dilution chamber 142-1, a second dilution chamber 142-2, a third dilution chamber 142-3, . . . , and an N-th dilution chamber 142-N in order. The plurality of dilution chambers 142 may be connected to the base chamber 141 via the quantitative pipe such that the dilution chambers 142 are connected to each other in parallel (not shown). Alternatively, the plurality of dilution chambers 142 may be connected to each other in series such that the liquid drug sample is transmitted from the first dilution chamber 142-1 to the second dilution chamber 142-2 via the quantitative pipe (see solid arrows in FIG. 2). In the case in which the plurality of dilution chambers 142 is connected to each other in series, the base chamber 141 and the first dilution chamber 142-1 may be connected to each other, the first dilution chamber 142-1 and the second dilution chamber 142-2 may be connected to each other, and the second dilution chamber 142-2 and the third dilution chamber 142-3 may be connected to each other.

The solvent tank 143 may store various kinds of solvents that can be used to dilute a drug. A plurality of solvent tanks 143 may be provided. The plurality of solvent tanks 143 may be referred to as a first solvent tank 143-1, a second solvent tank 143-2, a third solvent tank 143-3, . . . , and an N-th solvent tank 143-N in order. The plurality of solvent tanks 143 may be connected respectively to the dilution chambers 142 via the quantitative pipe. The solvent tanks 143 may transmit predetermined kinds of solvents in predetermined amounts to the dilution chambers 142 via the quantitative pipe, respectively. The solvent tanks 143 may include a washing liquid for washing the base chamber 141, the dilution chambers 142, and the quantitative pipe. The solvent may include phosphate-buffered saline (PBS), deionized water (DI water), or ethanol, which is used as a base for a liquid drug.

The quantitative pipe may connect the base chamber 141, the dilution chambers 142, and the solvent tanks 143 to each other and may transmit the liquid drug samples and the solvents in predetermined amounts. The quantitative pipe may include pipes configured to connect the base chamber 141, the dilution chambers 142, and the solvent tanks 143 to each other, a volume measurement unit, a flow controller, and an opening and closing controller. Equipment belonging to a volume measurement system (VMS) may be used as the volume measurement unit, and a proportional flow control valve or a proportional pressure control valve may be used as the flow controller. A mass flow controller (MFC) or a pressure flow controller (PFC) may also be used. Based on fluid flow, a lift valve, a butterfly valve, a pillow valve, or a rotary sliding valve may be used as the opening and closing controller. The quantitative pipe may transmit the diluted liquid drug samples stored in the dilution chambers 142 in amounts adjusted based on different rated volumes and flow rates for sensors 151.

Under control of the control unit 160, the dilution unit 140 injects a portion of the arbitrary liquid drug sample stored in the base chamber 141 into the dilution chambers 142 and injects the solvents in the solvent tanks 143 into the dilution chambers 142 such that the liquid drug sample is diluted at predetermined dilution ratios in the dilution chambers 142. For example, in the case in which the arbitrary liquid drug sample and the solvent are injected into the first dilution chamber 142-1 at a ratio of 1:10, a liquid drug sample diluted according to the dilution ratio (1:10) is generated. In the case in which the diluted liquid drug sample (a dilution ratio of 1:10) in the first dilution chamber 142-1 and the solvent are injected into the second dilution chamber 142-2 at a ratio of 1:10, a liquid drug sample diluted according to the dilution ratio (1:100) is generated. In the case in which the solvent is further injected into a portion of the diluted liquid drug sample in order to dilute the liquid drug sample, repeated dilution may be performed using the plurality of dilution chambers 142-1 ... 142-N, even though the dilution ratio is high, e.g. 1:10000. Consequently, it is possible to perform high-ratio dilution in a limited space and to conserve solvent used for dilution even though the dilution ratio is high.

When measurement of the arbitrary liquid drug sample is completed, under control of the control unit 160, the dilution unit 140 may discharge the liquid drug samples stored in the base chamber 141 and the dilution chambers 142 to a separate storage space and may wash the base chamber 141, the dilution chambers 142, and the quantitative pipe using the washing liquid stored in the solvent tanks 143.

Figure 3:
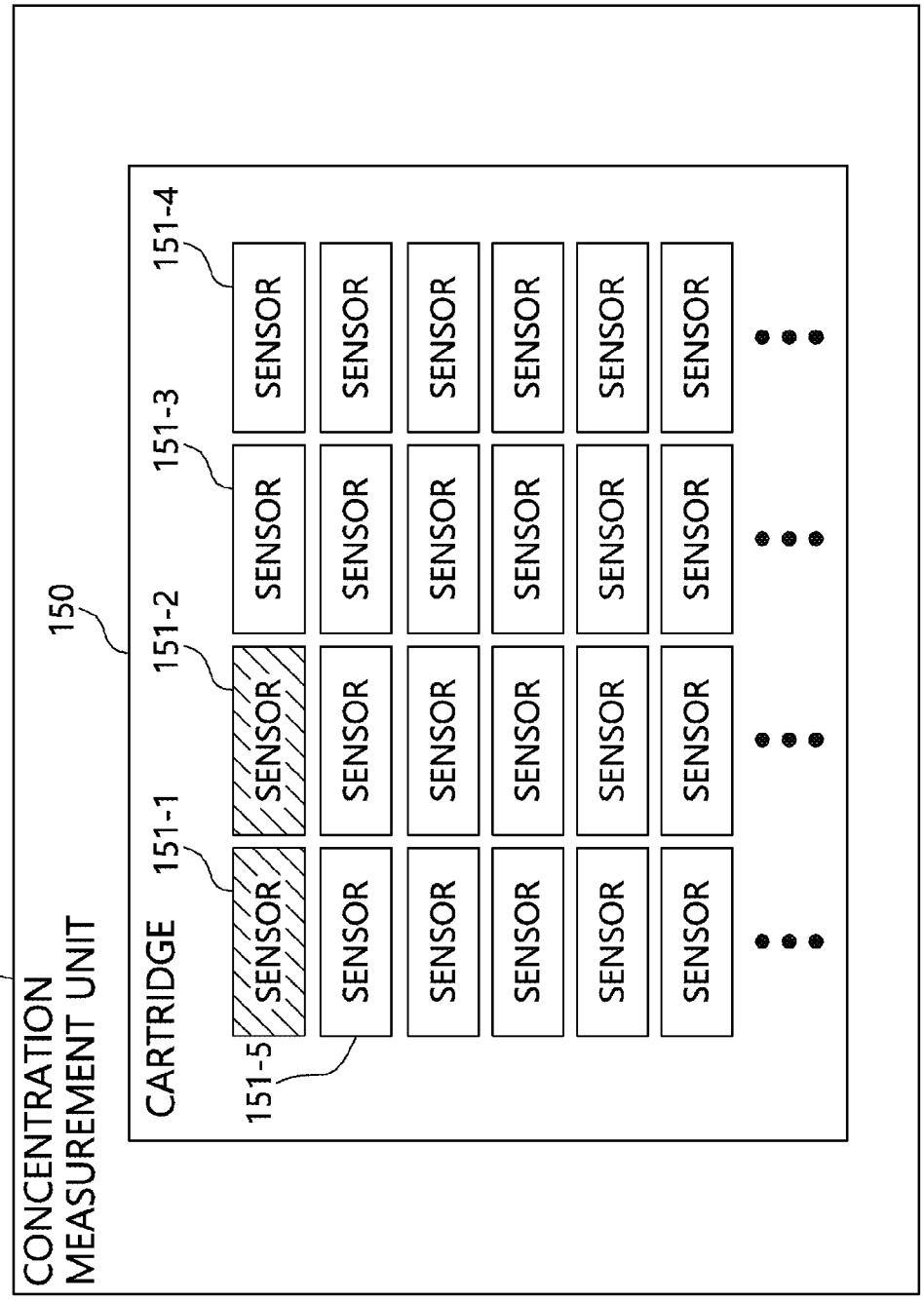
FIG. 3 is a block diagram showing in detail the construction of a concentration measurement unit and a cartridge in the multiple times available drug concentration measuring apparatus according to the embodiment of the present invention.

FIG. 3 is a block diagram showing in detail the construction of the concentration measurement unit 130 and the cartridge 150 in the multiple times available drug concentration measuring apparatus 100 according to the embodiment of the present invention. In FIG. 3, sensors 151-1 and 151-2 that have been used are shaded.

The concentration measurement unit 130 may measure the concentration of the liquid drug sample using the sensors 151. The concentration measurement unit 130 may use various kinds of sensors 151. Various types of sensors 151 may be used depending on the kinds of drugs. For example, a SAW or FET type sensor, a sensor using an antigen-antibody immune reaction, and a sensor capable of using an electrical analysis method, such as current-voltage, frequency change, phase change, peak intensity change, or retention time change may be used. The sensors 151 may be sensors that can be reused or sensors that cannot be reused. The concentration measurement unit 130 may include a structure necessary to expose a predetermined amount of the arbitrary liquid drug sample to the sensor 151, to operate the sensor 151, and transmit an output value of the sensor 151 to the control unit 160.

A replaceable cartridge 150 may be inserted into the concentration measurement unit 130. The concentration measurement unit 130 may expose a predetermined amount of the liquid drug sample to a predetermined sensor 151, among a plurality of sensors 151 disposed in the replaceable cartridge 150, may operate the sensor 151, and may provide data output by the sensor 151 to the control unit 160. The cartridge 150 may include a plurality of sensors 151. A plurality of same kind of sensors 151 may be disposed in the cartridge 150, or a plurality of different kinds of sensors 151 may be disposed in the cartridge 150. When the sensors 151 disposed in the cartridge 150 are all used, the cartridge 150 may be replaced with a new cartridge 150.

The control unit 160 may control the dilution unit 140 and the concentration measurement unit 130, and may calculate the concentration of the arbitrary liquid drug sample using the output value of the sensor 151 received from the concentration measurement unit 130. The control unit 160 may include a processor capable of executing computer program code, a memory, and a data transmission and reception module.

Referring to FIG. 2 together, a result output unit 170 may include a display or a printer configured to visually provide the measurement result of the concentration of the arbitrary liquid drug sample to a user, a speaker configured to provide auditory information to the user, a memory configured to store data, an input and output port configured to allow a USB storage device to be connected thereto, and a communication module configured to transmit and receive data using a short-range communication scheme, such as Bluetooth® or Wi-Fi®. The control unit 160 may provide the measurement result of the concentration of the liquid drug sample and information, such as the residual amount of the solvent tanks 143, whether to use the sensors 151, and the residual quantity of the cartridge 150 in which the sensors 151 are disposed, to the user via the result output unit 170.

Referring back to FIG. 1, the multiple times available drug concentration measuring apparatus 100 according to the embodiment of the present invention may further include a kind determination unit 120 configured to receive the liquid drug sample from the dilution unit 140 and to determine the kind of the drug, and the control unit 160 may further perform control such that the dilution unit 140 selects a solvent to dilute the liquid drug sample based on the kind of the drug in the liquid drug sample determined by the kind determination unit 120.

The kind determination unit 120 may use various types of sensors. The kind determination unit 120 may perform a screening test to determine the kind of the drug. In performing the screening test, the kind determination unit 120 may determine only the kind of the drug or, more simply, may find only a solvent suitable for dissolving the drug. The kind determination unit 120 may recognize the kind of the drug included in the arbitrary liquid drug sample or the solvent suitable for dissolving the drug through the screening test, and may transmit the recognized kind of the drug or the recognized solvent to the control unit 160. Upon receiving the kind of the drug included in the arbitrary liquid drug sample from the kind determination unit 120, the control unit 160 may find a solvent effective to dissolve the drug based on pre-stored data related to drugs.

The kind determination unit 120 may determine the kind of a solvent capable of effectively dissolving the drug included in the arbitrary liquid drug sample. For example, some kinds of drugs may be water-soluble and thus may easily be dissolved in water, and some kinds of drugs may be easily dissolved in alcohol or a volatile solvent. The kind determination unit 120 may determine a solvent capable of easily dissolving the drug, and may transmit the determined solvent to the control unit 160.

The control unit 160 performs control such that the dilution unit 140 selects the solvent capable of easily dissolving the drug included in the arbitrary liquid drug sample and performs dilution. Consequently, it is possible to dilute the arbitrary liquid drug sample using the solvent selected based on the kind of the drug, whereby it is possible to effectively measure drug concentration.

The arbitrary liquid drug sample may include drugs having various concentrations. In recent years, sensors configured to measure drug concentration have been developed in a direction toward improvement in sensitivity so as to sensitively react to low-concentration drugs. High-sensitivity sensors have an advantage of detecting low-concentration drugs. However, such high-sensitivity sensors have a problem in that it is difficult to measure drug concentration of a liquid drug sample having high drug concentration in proportion to sensitivity. That is, the lower limit of the concentration range that can be measured by a high-sensitivity sensor is low, and the upper limit of the concentration range is also low. In the case in which an arbitrary liquid drug sample is directly measured, therefore, the concentration thereof may not be accurately measured. For example, the output value of the high-sensitivity sensor 151 in the case in which the concentration of the drug included in the liquid drug sample is equal to the upper limit of the concentration range that can be measured by the high-sensitivity sensor 151 may be equal to the output value of the high-sensitivity sensor 151 in the case in which the concentration of the drug greatly exceeds the upper limit of the concentration range. In this case, it is difficult to accurately measure the concentration of the arbitrary liquid drug. However, the multiple times available drug concentration measuring apparatus 100 according to the embodiment of the present invention is capable of measuring the concentration of the arbitrary liquid drug sample over a wide range even though the high-sensitivity sensor 151 is used.

Upon determining based on the data received from the concentration measurement unit 130 that the concentration of the liquid drug sample exposed to the sensor 151 exceeds the upper limit of the concentration range that can be measured by the sensors 151, the control unit 160 of the multiple times available drug concentration measuring apparatus 100 according to the embodiment of the present invention may perform control such that the dilution unit 140 repeatedly dilutes the liquid drug sample exposed to the sensor 151, may transmit the repeatedly diluted liquid drug sample to the concentration measurement unit 130 such that the concentration of the liquid drug sample is repeatedly measured, and may calculate the concentration of the liquid drug that has not been diluted using a dilution ratio obtained as the result of repeated dilution.

The upper limit and the lower limit of the concentration range that can be measured by the sensors 151 may be pre-stored values. Since the output values of the sensors 151 as the upper limit of the concentration range that can be measured by the sensors 151 are also pre-stored values, the control unit 160 may compare the output values of the sensors 151 provided by the concentration measurement unit 130 with the pre-stored output values of the sensors 151 for each concentration.

In the case in which the concentration of the liquid drug sample exposed to the sensor 151 exceeds the upper limit of the concentration range that can be measured by the sensors 151, the control unit 160 may repeat a process of diluting the liquid drug sample exposed to the sensor 151 and measuring the concentration of the diluted liquid drug sample using the sensor 151 again. In the case in which concentration included in the concentration range that can be measured by the sensor 151 is measured as the result of the concentration measurement and the dilution being repeatedly performed, the control unit 160 may backwardly calculate the concentration of the original arbitrary liquid drug sample that has not been diluted using the dilution ratio obtained as the result of repeated dilution. Consequently, it is possible to measure the concentration of a high-concentration liquid drug sample even when the high-sensitivity sensor 151 is used.

Meanwhile, new drug concentration measurement sensors 151 may be developed as the result of technological development, and measurable concentration ranges of the sensors may be different from each other depending on manufacturers or manufacturing processes even though the kind of the sensors is the same. In the case in which the cartridge 150 is exchanged, therefore, it is necessary to recognize the concentration ranges that can be accurately measured by the sensors 151 disposed in the cartridge 150.

The control unit 160 may perform control such that the dilution unit 150 dilutes a standard sample so as to have various concentrations, may expose standard samples diluted so as to have various concentrations to the sensors 151 to analyze the output values of the sensors 151, and may learn the upper limit of the concentration range that can be measured by the sensors 151.

The standard sample is a liquid drug sample, from which the kind and concentration of the drug are known. The control unit 160 may variously dilute the standard sample so as to have concentrations approximate to the upper limit of the concentration range that can be measured by the sensors 151 included in the cartridge 150. For example, the standard sample may be diluted so as to have concentration equal to the upper limit of the concentration range that can be measured by the sensors 151, concentration slightly higher than the upper limit, and concentration slightly lower than the upper limit. The control unit 160 may expose the standard samples diluted so as to have various concentrations to the sensors 151 and may analyze the output values of the sensors 151 to recognize the upper limit of the concentration range of sensors 151.

Hereinafter, a multiple times available drug concentration measuring method that can be performed using the multiple times available drug concentration measuring apparatus 100 according to the embodiment of the present invention will be described. The multiple times available drug concentration measuring method may include a concentration calculation algorithm, a cartridge residual quantity recognition algorithm, and a sensor concentration range recognition algorithm.

Figure 4:
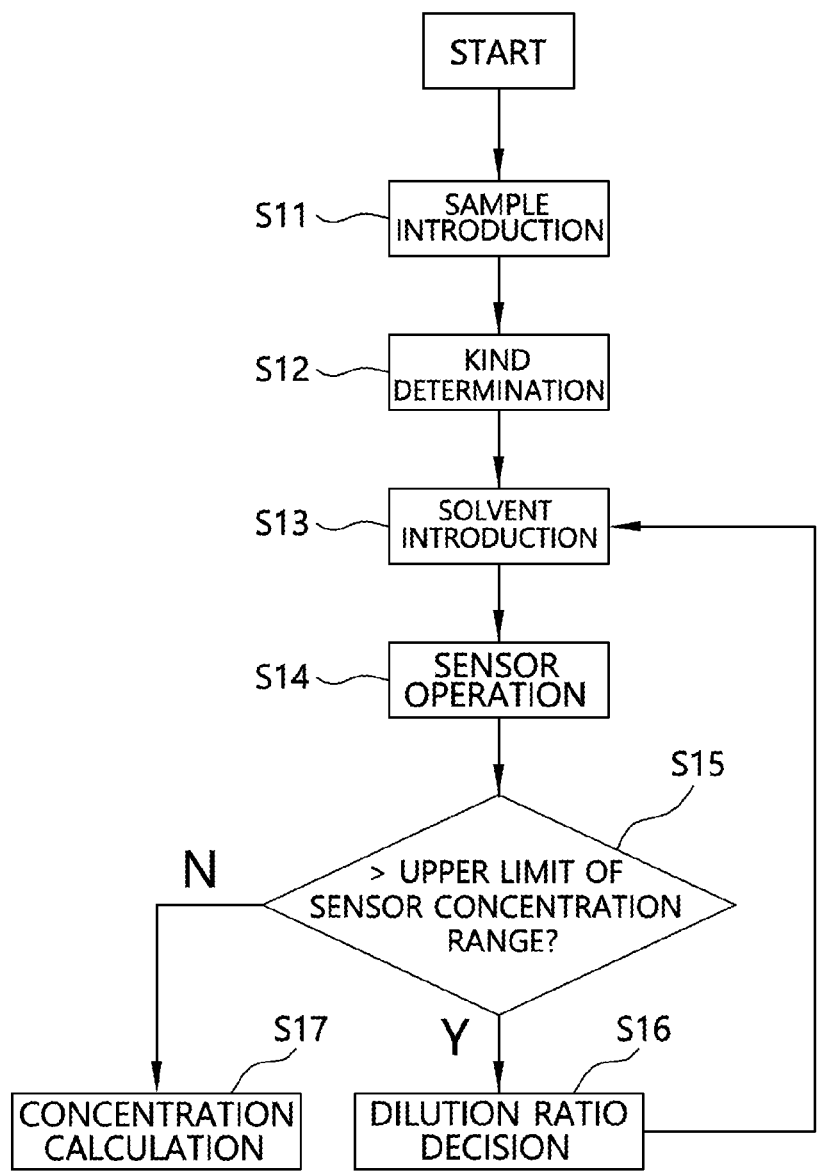
FIG. 4 is a flowchart showing respective steps of a concentration calculation algorithm in a multiple times available drug concentration measuring method according to an embodiment of the present invention.

FIG. 4 is a flowchart showing respective steps of a concentration calculation algorithm in a multiple times available drug concentration measuring method according to an embodiment of the present invention.

As shown in FIG. 4, the multiple times available drug concentration measuring method according to the embodiment of the present invention may include a sample introduction step (S11) of storing a liquid drug sample injected through the sample input unit 110 in the dilution unit 140, a kind determination step (S12) of determining the kind of the drug in the liquid drug sample, a solvent introduction step (S13) of introducing a solvent selected based on the determined kind of the drug into the liquid drug sample according to a predetermined dilution ratio in order to dilute the liquid drug sample, a sensor operation step (S14) of exposing the liquid drug sample to the sensor 151 to acquire an output value of the sensor 151, a high-concentration determination step (S15) of determining whether the concentration of the liquid drug sample calculated based on the output value of the sensor 151 exceeds the upper limit of the concentration range that can be measured by the sensors 151, a dilution ratio decision step (S16) of deciding a dilution ratio necessary to repeat dilution by performing the solvent introduction step (S13) and subsequent steps again in the case in which the concentration of the liquid drug sample exceeds the upper limit, and a concentration calculation step (S17) of calculating the concentration of the liquid drug sample before dilution using the dilution ratio in the case in which the concentration of the liquid drug sample does not exceed the upper limit.

The sample introduction step (S11) is a process in which, when an arbitrary liquid drug sample acquired at the scene of a drug-related accident or crime is injected into the sample input unit 110, the arbitrary liquid drug sample introduced through the sample input unit 110 is stored in the base chamber 141 of the dilution unit 140. The base chamber 141 temporarily stores the injected liquid drug sample.

In the kind determination step (S12), the control unit 160 performs control such that the dilution unit 140 transmits a portion of the arbitrary liquid drug sample stored in the base chamber 141, and the kind determination unit 120 performs a screening test to recognize the kind of the drug or the solvent capable of dissolving the drug and provides related data to the control unit 160. The control unit 160 may perform control such that the dilution unit 140 transmits a predetermined amount of the arbitrary liquid drug sample to at least one sensor 151 that is used by the kind determination unit 120 via the quantitative pipe. The kind determination unit 120 may recognize the kind of the drug included in the arbitrary liquid drug sample and may transmit the recognized kind of the drug to the control unit 160, or may recognize the kind of the solvent capable of dissolving the drug and may transmit the recognized kind of the solvent to the control unit 160.

In the solvent introduction step (S13), the control unit 160 performs control such that the dilution unit 140 transmits a portion of the arbitrary liquid drug sample stored in the base chamber 141 to the dilution chamber 142 according to a predetermined dilution ratio and may introduce a solvent into the dilution chamber 142 to perform dilution. At this time, the control unit 160 may select the solvent capable of effectively dissolving the drug based on the kind of the drug or the kind of the solvent received from the kind determination unit 120, and may perform control such that the dilution unit 140 supplies a necessary solvent from the plurality of solvent tanks 143, in which various kinds of solvents are stored, to the dilution chamber 142.

The dilution ratio, which is the ratio of the liquid drug sample to the solvent, may be a predetermined value, such as 1:10, 1:100, or 1:1000, or may be a value set by input of the user of the multiple times available drug concentration measuring apparatus 100. The dilution ratio may be gradually increased such that the ratio of the liquid drug sample to the solvent is 1:10 at the time of one-time dilution, 1:20 at the time of two-time dilution, and 1:30 at the time of three-time dilution, or may be gradually decreased such that the ratio of the liquid drug sample to the solvent is 1:30 at the time of one-time dilution, 1:20 at the time of two-time dilution, and 1:10 at the time of three-time dilution. The user may select the mode in which the dilution ratio is gradually increased or the mode in which the dilution ratio is gradually decreased. Since the user decides the dilution mode depending on the state of the liquid drug sample acquired at the scene, it is possible to provide the dilution mode capable of reducing the number of measurements based on the decision of the user.

The control unit 160 may perform control such that the quantitative pipe of the dilution unit 140 transmits the liquid drug sample to a sensor 151 that has not been used, among the plurality of sensors 151 disposed in the cartridge 150.

In the sensor operation step (S14), the control unit 160 performs control such that the dilution unit 150 exposes a predetermined amount of the liquid drug sample stored in the base chamber 141 or the dilution chamber 142 to the sensor 151 and acquires the output value of the sensor 151 from the concentration measurement unit 130. The quantitative pipe of the dilution unit 140 may transmit a predetermined amount of the liquid drug sample from the base chamber 141 or the dilution chamber 142 to the sensor 151 disposed in the cartridge 150 of the concentration measurement unit 130.

In the high-concentration determination step (S15), the control unit 160 determines whether the concentration of the liquid drug sample calculated based on the output value of the sensor 151 received from the concentration measurement unit 130 exceeds the upper limit of the concentration range that can be measured by the sensors 151. The concentration measurement unit 130 transmits the output value of the sensor 151 to the control unit 160. The control unit 160 may decide the concentration of the liquid drug sample corresponding to the output value of the sensor 151 received from the concentration measurement unit 130 based on the pre-stored output value data of the sensor 151 for each measurement concentration. The control unit 160 determines whether the measured concentration of the liquid drug sample exceeds the upper limit of the concentration range that can be measured by the sensors 151. The determination result may be provided to the user via the result output unit 170.

In the case in which the concentration of the liquid drug sample exceeds the upper limit, the dilution ratio decision step (S16) is performed, and then the solvent introduction step (S13), the sensor operation step (S14), and the high-concentration determination step (S15) are repeatedly performed. In the dilution ratio decision step (S16), the dilution ratio is decided in order to repeatedly dilute the liquid drug sample from the solvent introduction step (S13). The dilution ratio may be equal to or different from the initial dilution ratio. The dilution ratio may be decided by user input. Whenever dilution is repeated, the same dilution ratio may be applied, or the dilution ratio may be increased or decreased.

In the case in which the concentration of the liquid drug sample does not exceed the upper limit, the control unit 160 may perform the concentration calculation step (S17) of calculating the concentration of the liquid drug sample. In the concentration calculation step (S17), the control unit 160 decides the concentration of the diluted liquid drug sample based on the output value of the sensor 151 received from the concentration measurement unit 130, and calculates the concentration of the liquid drug sample before dilution in consideration of the repeated dilution ratio. For example, in the case in which dilution is performed twice, the control unit 160 may calculate the concentration of the liquid drug sample before dilution, since the control unit 160 knows the concentration of the diluted liquid drug sample measured within the concentration range that can be measured by the sensor 151 and also knows the dilution ratio when dilution is performed twice.

Figure 5:
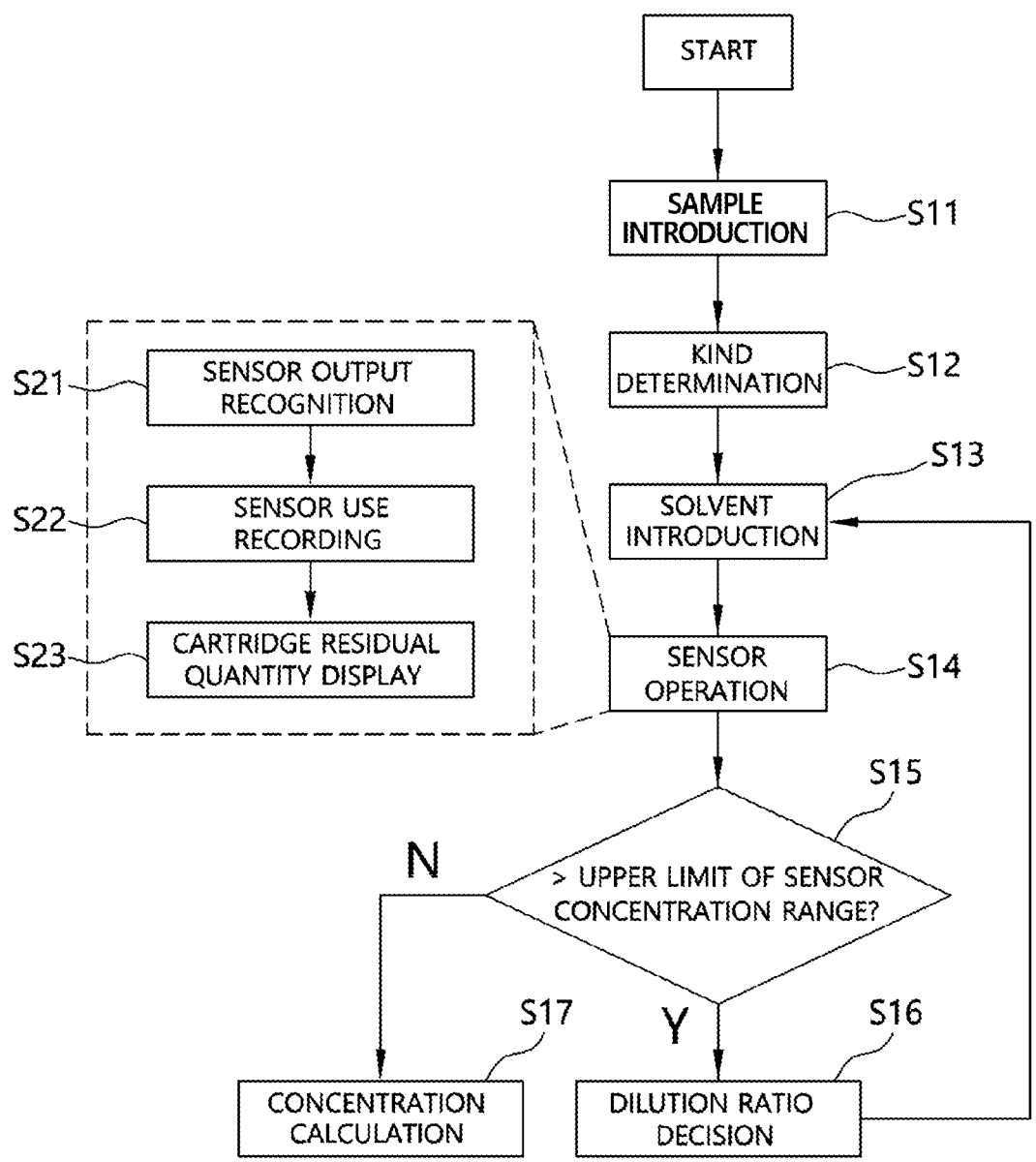
FIG. 5 is a flowchart showing respective steps of a cartridge residual quantity recognition algorithm in the multiple times available drug concentration measuring method according to the embodiment of the present invention.

FIG. 5 is a flowchart showing respective steps of the cartridge residual quantity recognition algorithm in the multiple times available drug concentration measuring method according to the embodiment of the present invention.

The sensor operation step (S14) of the multiple times available drug concentration measuring method according to the embodiment of the present invention may include a sensor output recognition step (S21) of the liquid drug sample being exposed to the sensor 151 and the control unit 150 recognizing the output value of the sensor 151, a sensor use recording step (S22) of recording that the sensor 151 providing the output value has been used, and a cartridge residual quantity display step (S23) of displaying the number of unused sensors 151 in the cartridge 150, in which the plurality of sensors 151 is disposed, to inform of the replacement cycle of the cartridge 150.

The sensor 151 disposed in the cartridge 150 may be a multiple times available sensor. In the case in which the sensor 151 is disposable, however, it is difficult to reuse the sensor 151 that has already been used. In the sensor operation step (S14), therefore, it is necessary to record the sensor 151 that has been used. The sensor output recognition step (S21) is a process of the control unit receiving the output value of the sensor 151 when the liquid drug sample is exposed to the sensor 151. At this time, the control unit 160 may receive information about which sensor 151 has been used from the concentration measurement unit 130, and may perform the sensor use recording step (S22) of storing the fact that the sensor providing the output value has been used in the memory. When the used sensor 151 is recorded, the control unit 160 may check the number of residual sensors 151 in the cartridge 150, and the control unit 160 may perform the cartridge residual quantity display step (S23) of providing the number of residual sensors 151 to the user through the result output unit 170. When the sensors 151 are all used, an alarm indicating that it is necessary to exchange the cartridge 150 may be provided to the user through the result output unit 170. Since the control unit 160 knows whether or not the sensors 151 have been used, the control unit 160 may perform control such that the dilution unit 140 transmits the liquid drug sample to a sensor 151 that has not been used in the sensor operation step (S14).

Figure 6:
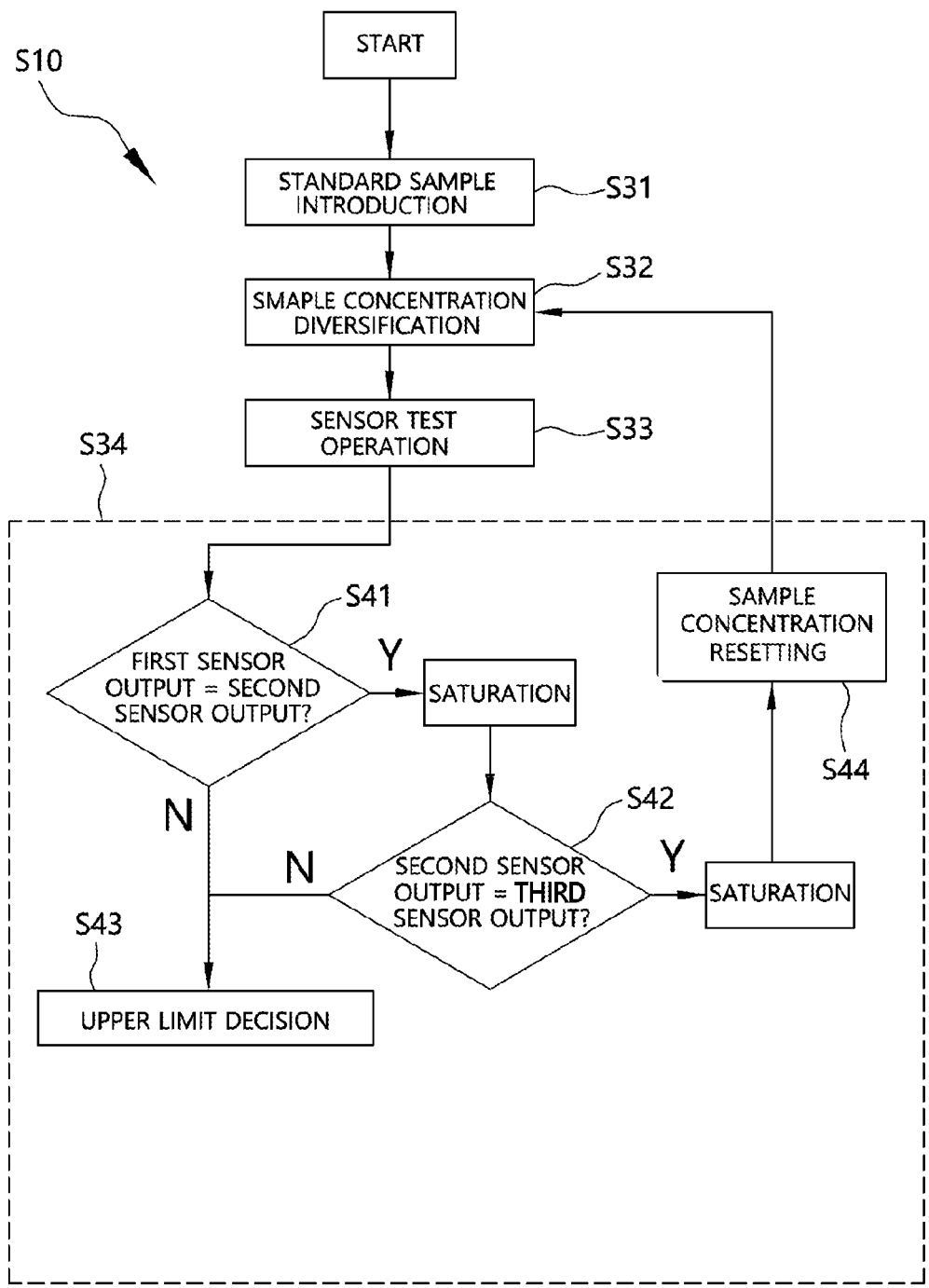
FIG. 6 is a flowchart showing respective steps of a sensor concentration range recognition algorithm in the multiple times available drug concentration measuring method according to the embodiment of the present invention.
Figure 7:
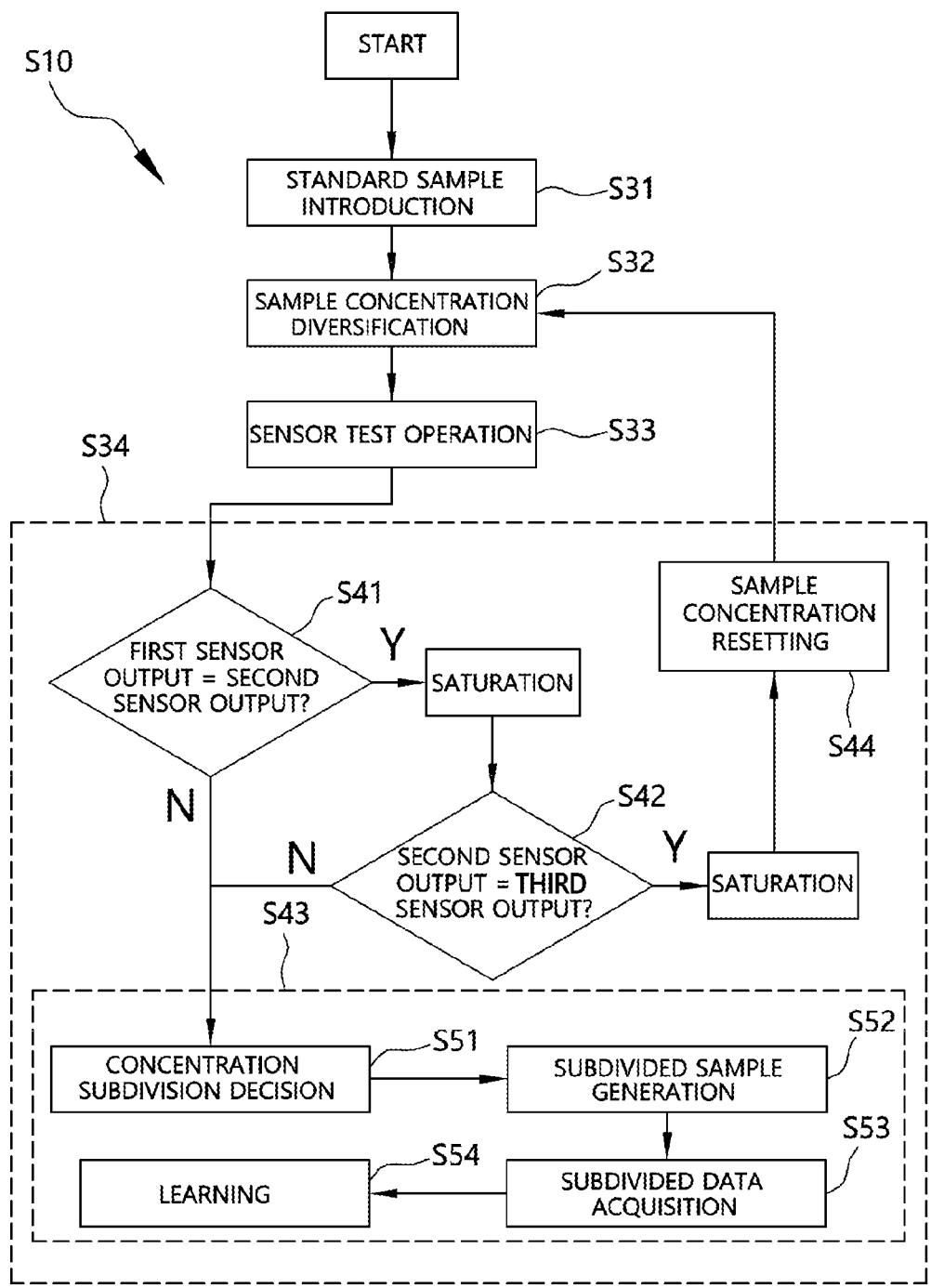
FIG. 7 is a flowchart showing changed steps of the sensor concentration range recognition algorithm in the multiple times available drug concentration measuring method according to the embodiment of the present invention.

FIG. 6 is a flowchart showing respective steps of the sensor concentration range recognition algorithm in the multiple times available drug concentration measuring method according to the embodiment of the present invention, and FIG. 7 is a flowchart showing changed steps of the sensor concentration range recognition algorithm in the multiple times available drug concentration measuring method according to the embodiment of the present invention.

As shown in FIG. 6, the multiple times available drug concentration measuring method according to the embodiment of the present invention may further include a concentration range recognition step (S10) of recognizing the upper limit of the concentration range that can be measured by the sensors 151 using a standard sample. The concentration range recognition step (S10) may include a standard sample introduction step (S31) of storing the standard sample injected through the sample input unit 110 in the dilution unit 140, a sample concentration diversification step (S32) of introducing a solvent into the standard sample according to various dilution ratios to generate standard samples having various concentrations, a sensor test operation step (S33) of exposing the standard samples to the plurality of sensors 151 to acquire output values of the plurality of sensors 151, and a critical value recognition step (S34) of comparing the output values of the sensors 151 that have measured the standard samples having different concentrations, among the plurality of sensors 151, with each other to recognize concentrations at which the sensors 151 are not saturated.

The concentration range recognition step (S10) is a process of recognizing the upper limit of the concentration range that can be measured by the sensors 151 included in the cartridge 150. In the case in which the cartridge 150 is removed and a new cartridge 150 is inserted, the concentration range recognition step (S10) may be performed before the concentration calculation algorithm of FIG. 4 is performed. In the concentration range recognition step (S10), the standard sample may be used. Alternatively, an arbitrary liquid drug sample having unknown concentration may be used.

In the standard sample introduction step (S31), the standard sample injected by the user through the sample input unit 110 is stored in the base chamber 141 of the dilution unit 140.

In the sample concentration diversification step (S32), standard samples diluted according to predetermined various dilution ratios are generated. A portion of an undiluted standard sample stored in the base chamber 141 may be transmitted to the first dilution chamber 142-1 and a solvent may be injected into the first dilution chamber 142-1 at the dilution ratio to generate a standard sample diluted at a first ratio. In addition, a portion of the standard sample diluted at the first ratio stored in the first dilution chamber 142-1 is transmitted to the second dilution chamber 142-2 and a solvent may be injected into the second dilution chamber 142-2 at the dilution ratio to generate a standard sample diluted at a second ratio. This process may be repeated a predetermined number of times. In this specification, the above two processes and the process in which a standard sample diluted at a third ratio is generated in the third dilution chamber 142-3 will be described by way of example.

In the sensor test operation step (S33), standard samples generated so as to have various concentrations and stored respectively in the dilution chambers 142 are exposed respectively to the sensors 151, and the control unit 160 acquires the output value of each of the plurality of sensors 151 to which the standard samples are exposed. The control unit 160 performs control such that the dilution unit 140 exposes a standard sample diluted at one of the ratios to one of the sensors 151. For example, a standard sample diluted at a first ratio may be exposed to a first sensor 151-1, a standard sample diluted at a second ratio may be exposed to a second sensor 151-2, and a standard sample diluted at a third ratio may be exposed to a third sensor 151-3. Each of the first, second, and third sensors 151-1, 151-2, and 151-3 outputs an output value, and the control unit 160 may receive the output value of each sensor 151-1, 151-2, and 151-3 through the concentration measurement unit 130.

In the critical value recognition step (S34), the output values of the plurality of sensors 151 are compared with each other to recognize the concentration at which the sensors 151 are not saturated. Since the standard samples to be exposed to the sensors 151 are diluted so as to have various concentrations in the sample concentration diversification step (S32), the sensors 151 measure standard samples having different concentrations, respectively. The control unit 160 may compare the output values of the sensors 151 that have measured the standard samples having different concentrations to recognize the upper limit of the concentration range that can be measured by the sensors 151.

The critical value recognition step (S34) may include a first output comparison step (S41) of comparing the output value of the first sensor 151-1 that has measured the standard sample having the first highest concentration and the output value of the second sensor 151-2 that has measured the standard sample having the second highest concentration with each other, a second output comparison step (S42) of comparing the output value of the second sensor 151-2 that has measured the standard sample having the second highest concentration and the output value of the third sensor 151-3 that has measured the standard sample having the third highest concentration with each other, among the plurality of sensors 151, a sample concentration resetting step (S44) of determining that the sensors 151 are saturated in the case in which the output values are equal to each other as the result of performing the first output comparison step (S41) or the second output comparison step (S42) and resetting the concentration of the standard sample so as to have lower concentration, and an upper limit decision step (S43) of recognizing the concentration of the standard sample exposed to the sensor 151 having the lower output value as the result of performing the first output comparison step (S41) or the second output comparison step (S42) as the upper limit of the concentration range that can be measured by the sensors 151.

The first output comparison step (S41) and the second output comparison step (S42) may be sequentially performed or may be simultaneously performed. For example, in the case in which the output value of the first sensor 151-1 and the output value of the second sensor 151-2 are equal to each other as the result of performing the first output comparison step (S41), it may be determined that the concentration of the standard sample exposed to the first sensor 151-1 and the concentration of the standard sample exposed to the second sensor 151-2 are high and thus the sensors 151-1 and 151-2 are saturated, and the second output comparison step (S42) may be performed. Alternatively, the first output comparison step (S41) and the second output comparison step (S42) may be simultaneously performed, and the sample concentration resetting step (S44) or the upper limit decision step (S43) may be performed based on the results of comparison.

The sample concentration resetting step (S44) is performed in the case in which all of the concentrations of the standard samples exposed to the first sensor 151-1, the second sensor 151-2, and the third sensor 151-3 exceed the upper limit of the concentration range that can be measured by the sensors 151. In this case, the control unit 160 may reset the sample concentration to a concentration lower than the concentration of the standard sample exposed to the third sensor 151-3 having the lowest concentration in the sample concentration resetting step (S44), and may perform the sample concentration diversification step (S32) and subsequent steps again based on the reset sample concentration.

In the upper limit decision step (S43), in the case in which any one of the output values of the first sensor 151-1, the second sensor 151-2, and the third sensor 151-3 is low, the concentration of the standard sample exposed to the sensor 151-1, 151-2, or 151-3 having the low output value is decided to be the upper limit of the concentration range that can be measured by the sensors 151. Since the diluted concentration of the standard sample is decided in the vicinity of the pre-stored upper limit of the concentration range that can be measured by the sensors 151 in the sample concentration diversification step (S32) and it is expected that uniformity in quality of the sensors 151 is guaranteed to some extent, it is reasonable for the concentration of the standard sample exposed to the sensor 151 having the lowest output value, among the first sensor 151-1, the second sensor 151-2, and the third sensor 151-3, to be decided to be the upper limit.

As shown in FIG. 7, the upper limit decision step (S43) may include a concentration subdivision decision step (S51) of selecting two sensors 151 from among sensors 151 that have output different output values in order of higher concentration to lower concentration of the standard samples and subdividing the concentrations of the standard samples within the concentration range of the two standard samples exposed to the selected two sensors 151, a subdivided sample generation step (S52) of introducing the solvent into the standard samples according to the subdivided concentrations of the standard samples to generate standard samples having subdivided concentrations, a subdivided data acquisition step (S53) of exposing the standard samples having subdivided concentrations to the plurality of sensors 151 to acquire output values of the plurality of sensors 151, and a learning step (S54) of learning the upper limit of the concentration range that can be measured by the sensors 151 using a function between the output values acquired in the subdivided data acquisition step (S53) and the subdivided concentrations of the standard samples.

In the upper limit decision step (S43), the concentration may not be directly decided. The concentrations of the standard samples may be diversified, and the sensors 151 may be tested once more to decide the upper limit of the concentration range of the sensors 151 in more detail.

In the concentration subdivision decision step, two sensors 151 that output different output values are selected from among the first, second, and third sensors 151-1, 151-2, and 151-3. For example, in the case in which the output value of the first sensor 151-1 and the output value of the second sensor 151-2 are equal to each other and the output value of the third sensor 151-3 is lower than the output value of the second sensor 151-2, the second sensor 151-2 and the third sensor 151-3 are selected. In the case in which the three sensors 151 have different output values, two sensors 151 are selected in order of higher concentration to lower concentration of the standard samples. For example, in the case in which the first, second, and third sensors 151-1, 151-2, and 151-3 have different output values, the first sensor 151-1 and the second sensor 151-2, which correspond to higher concentrations of the standard samples, are selected. The reason for this is that it is reasonable to further test the sensors 151 within the range within which the concentrations of the standard samples are high in order to measure the upper limit of the concentration range that can be measured by the sensors 151. Consequently, the concentrations of the standard samples exposed to the two selected sensors 151 are decided to be the upper limit and the lower limit, and the concentrations are subdivided within the range therebetween. For example, in the case in which the standard samples exposed to the first sensor 151-1 and the second sensor 151-2 are diluted at a first ratio and a second ratio, respectively, third, fourth, and fifth ratios may be decided as ratios between the first ratio and the second ratio in the concentration subdivision decision process.

In the subdivided sample generation step (S52), the standard samples are diluted according to the concentrations decided in the concentration subdivision decision step (S51). The subdivided sample generation step (S52) is identical to the sample concentration diversification step (S32) except for the diluted concentration.

In the subdivided data acquisition step (S53), the standard samples having subdivided concentrations generated in the subdivided sample generation step (S52) are exposed to the sensors 151-3 to 151-5, and the outputs of the sensors 151-3 to 151-5 are provided to the control unit 160. This step is identical to the sensor test operation step (S33).

In the concentration range learning step (S54), the control unit 160 may generate a function using the output value of each sensor 151 and the subdivided concentrations, and may learn the upper limit of the concentration range that can be measured by the sensors 151 further using the saturated concentrations and the output values of the sensors 151 acquired in the sensor test operation step (S33). The results of measurement may be displayed in a two-dimensional plane having the concentrations of the standard samples on the horizontal axis and the output values of the sensors 151 on the vertical axis, and the saturated concentrations of the sensors 151 may be acquired through a trend of the concentrations of the standard samples and the output values of the sensors 151.

According to the embodiment of the present invention, as described above, various kinds of drug sensors 151 may be used, whereby it is possible to detect various kinds of drugs and to measure the concentrations of the drugs.

In addition, according to the embodiment of the present invention, it is possible to measure concentration lower than the concentration range that can be measured by the sensors 151 through an algorithm of repeatedly diluting the arbitrary liquid drug sample to measure the concentration thereof even in the case in which the concentration of the arbitrary liquid drug sample is high in consideration of the case in which the concentration of an arbitrary liquid drug sample exceeds the upper limit of the concentration range that can be measured by the sensors 151, whereby the output of each of the sensors 151 is reliable and it is possible to accurately measure the concentration of a high-concentration liquid drug by calculating and reflecting the dilution ratio to the final output values of the sensors 151.

In addition, according to the embodiment of the present invention, a replaceable cartridge 150 having a plurality of sensors 151 disposed therein may be used, whereby plenty of measurements are possible using a single cartridge 150 and inspection may be continued by replacing the cartridge 150 on the scene. Furthermore, even in the case in which cartridges 150 manufactured by different manufacturers are used, it is possible to learn the concentration range that can be measured by the sensors 151 by repeatedly testing the sensors 151, whereby it is possible to use various cartridges. Moreover, the concentration measuring apparatus 100 may record the number of times that the cartridge 150 is used, whereby it is possible to efficiently measure concentration depending on the number of times that the cartridge is used.

Figure 8:
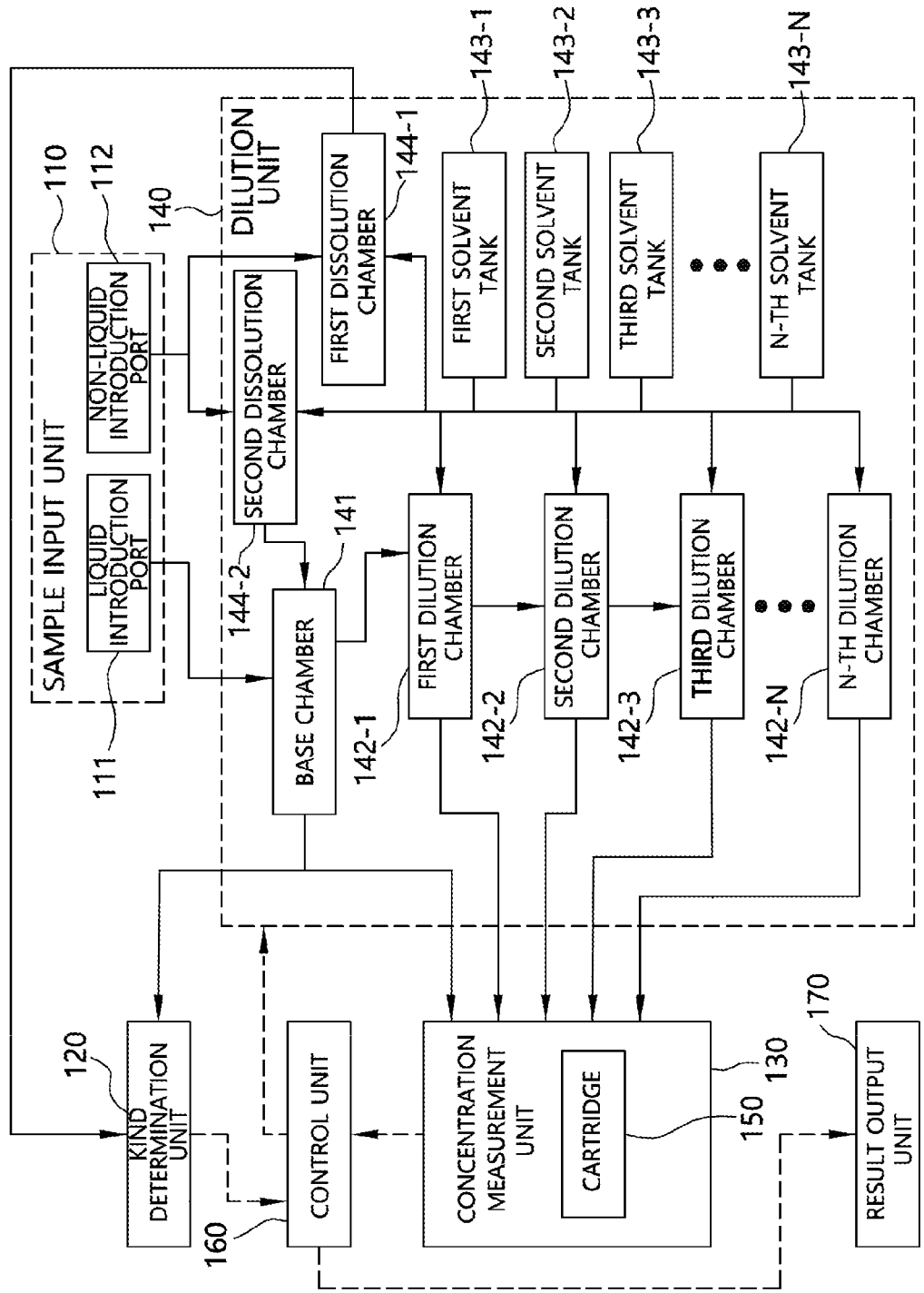
FIG. 8 is a block diagram showing in detail the construction of a sample input unit and the dilution unit in the multiple times available drug concentration measuring apparatus according to the embodiment of the present invention capable of further measuring a non-liquid drug.

FIG. 8 is a block diagram showing in detail the construction of the sample input unit 110 and the dilution unit 140 in the multiple times available drug concentration measuring apparatus 100 according to the embodiment of the present invention capable of further measuring a non-liquid drug.

A non-liquid drug sample suspected as including drugs as well as a liquid drug sample including drugs may exist at the scene of a drug crime or accident. The non-liquid drug sample may be provided in various forms, such as powder, capsules, and tablets. The non-liquid drug sample may be provided in the form of a package, and a non-liquid drug sample including powdered drugs may be provided in towels, tissue paper, or clothes or may be provided on floors or tables. In order to acquire the non-liquid drug sample at the scene, a tool, such as scotch tape or a vacuum cleaner, may be used, and the acquired non-liquid drug sample may include various kinds of foreign matter, such as dust, wheat flour, and cookie crumbs, in addition to drugs. Therefore, it is necessary to provide an apparatus and method for determining whether a drug is present in a non-liquid drug sample and measuring the amount of the drug. The multiple times available drug concentration measuring apparatus 100 according to another embodiment of the present invention is capable of measuring the concentration of the non-liquid drug sample.

As shown in FIG. 8, the sample input unit 110 of the multiple times available drug concentration measuring apparatus 100 according to another embodiment of the present invention may include a liquid introduction port 111 having a structure capable of allowing a liquid drug sample to be introduced therethrough and a non-liquid introduction port 112 having a structure capable of allowing a non-liquid drug sample to be introduced therethrough, and the dilution unit 140 may further include a dissolution chamber 144 configured to receive the non-liquid drug sample introduced through the non-liquid introduction port 112 and to expose the received non-liquid drug sample to solvents received from the solvent tanks 143 in order to dissolve a drug included in the non-liquid drug sample. The control unit 160 may further perform control such that the dilution unit 140 transmits the non-liquid drug sample having the drug dissolved in the solvents from the dissolution chamber 144 to the kind determination unit 120 or the base chamber 141.

The sample input unit 110 may allow the non-liquid drug sample and the liquid drug sample to be introduced through introduction ports having different structures. In order to prevent mixing of the samples, the liquid introduction port 111 and the non-liquid introduction port 112 may be configured to be physically separated from each other. The non-liquid introduction port 112 may be connected to the dissolution chamber 144-1, 144-2 of the dilution unit 140.

The dilution unit 140 may further include a dissolution chamber 144-1, 144-2. The dissolution chamber 144-1, 144-2 performs a function of dissolving the non-liquid drug sample in a solvent. Since the non-liquid drug sample may have various forms, the dissolution chamber 144-1, 144-2 may have a heating function, a mixing function, a pulverization function, and a cooling function. A plurality of dissolution chambers 144-1 . . . 144-N may be provided though only two dissolution chambers 144-1 and 144-2 are illustrated in FIG. 8 due to the limitation of space. The plurality of dissolution chambers 144-1 . . . 144-N may be referred to as a first dissolution chamber 144-1, a second dissolution chamber 144-2, a third dissolution chamber 144-3, . . . , and an N-th dissolution chamber 144-N. The plurality of dissolution chambers 144-1 . . . 144-N may perform different functions. In the embodiment of the present invention, the case in which the first dissolution chamber 144-1 and the second dissolution chamber 144-2 are included will be described by way of example.

The dissolution chambers 144 may include a first dissolution chamber 144-1 configured to receive a portion of the non-liquid drug sample introduced through the non-liquid introduction port 112, to receive various kinds of solvents from the solvent tanks 143 in order to dissolve the non-liquid drug sample and to generate a composite-solvent drug sample under control of the control unit 160, and to provide a portion of the generated composite-solvent drug sample to the kind determination unit 120 and a second dissolution chamber 144-2 configured to receive a portion of the non-liquid drug sample introduced through the non-liquid introduction port 112, to receive a kind of solvent suitable for dissolving a drug included in the non-liquid drug sample from the solvent tanks 143 based on the result of determination of the kind determination unit 120 in order to dissolve the non-liquid drug sample and to generate a liquid drug sample, and to provide a portion of the generated liquid drug sample to the base chamber 141.

In the embodiment of the present invention, the first dissolution chamber 144-1 may dissolve the non-liquid drug sample in a mixed solvent in which various kinds of solvents are mixed with each other. The mixed solvent may include various kinds of solvents, such as a hydrophilic solvent, a hydrophobic solvent, and a volatile solvent. The non-liquid drug sample is dissolved in the mixed solvent, whereby a composite-solvent drug sample is generated. The composite-solvent drug sample may include an arbitrary kind of drug. Since an arbitrary liquid drug sample is in the state in which a drug is already dissolved in a solvent, it is possible to directly determine the kind of the drug. However, it is not possible to know in which kind of solvent an arbitrary non-liquid drug sample will be dissolved. In order to know the kind of the drug, therefore, it is necessary to dissolve the non-liquid drug sample in the mixed solvent first. The first dissolution chamber 144-1 may perform this function.

The composite-solvent drug sample stored in the first dissolution chamber 144-1 may be transmitted to the kind determination unit 120, and the kind determination unit 120 may determine the kind of the drug included in the composite-solvent drug sample or the kind of a solvent suitable for dissolving the drug and may provide the determined kind of the drug or the solvent to the control unit 160.

The second dissolution chamber 144-2 may generate a liquid drug sample necessary to measure the concentration of the drug included in the non-liquid drug sample. The control unit 160 may select a solvent suitable for dissolving the drug included in the non-liquid drug sample based on the result of determination of the kind determination unit 120, and may perform control such that the dilution unit 140 supplies a predetermined amount of the solvent from the solvent tanks 143 to the second dissolution chamber 144-2. The second dissolution chamber 144-2 may perform heating, cooling, mixing, and pulverization in order to dissolve the non-liquid drug sample in the solvent. The second dissolution chamber 144-2 may dissolve the non-liquid drug sample in the solvent to generate a liquid drug sample, and may transmit the liquid drug sample to the base chamber 141 under control of the control unit 160. The liquid drug sample generated in the second dissolution chamber 144-2 may be transmitted to the base chamber 141, and may be diluted in the dilution chamber 142 according to a concentration calculation algorithm. The concentration of the liquid drug sample may be measured by the concentration measurement unit 130, and the initial concentration of the liquid drug sample may be calculated by the control unit 160. Since the control unit 160 knows the amount of the solvent provided to the second dissolution chamber 144-2, it is possible to backwardly calculate the amount of drug included in the non-liquid drug sample.

Figure 9:
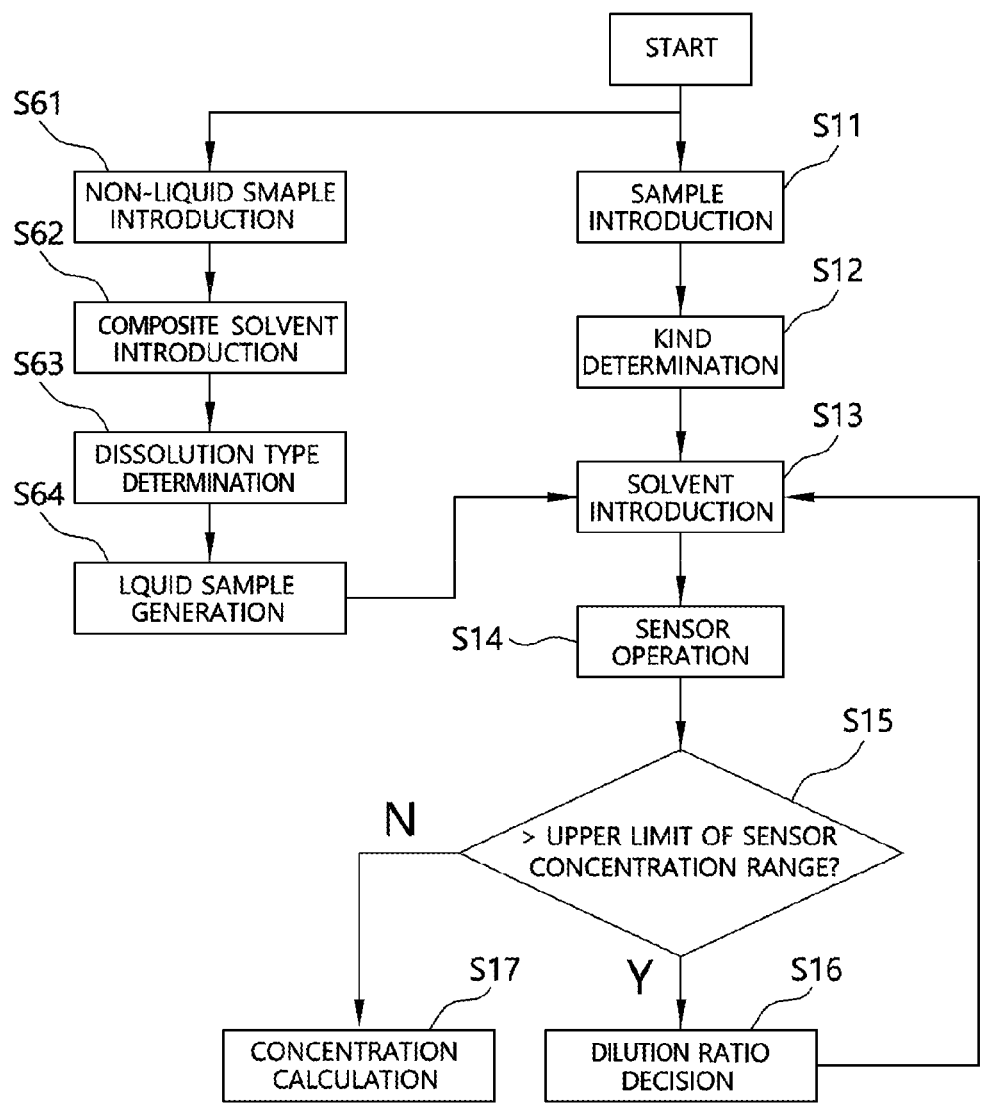
FIG. 9 is a flowchart showing respective steps of a non-liquid sample measurement algorithm in the multiple times available drug concentration measuring method according to the embodiment of the present invention.

FIG. 9 is a flowchart showing respective steps of a non-liquid sample measurement algorithm in the multiple times available drug concentration measuring method according to the embodiment of the present invention.

The multiple times available drug concentration measuring method according to the embodiment of the present invention may further include a non-liquid sample introduction step (S61) of storing a non-liquid drug sample injected through the non-liquid introduction port 112 of the sample input unit 110 in the first dissolution chamber 144-1 and the second dissolution chamber 144-2 of the dilution unit 140 in a divided state, a composite solvent introduction step (S62) of receiving various kinds of solvents from the solvent tanks 143-1 . . . 143-N of the dilution unit 140, mixing the solvents, and dissolving the non-liquid drug sample in the mixed solvents to generate a composite-solvent drug sample in the first dissolution chamber 144-1, a dissolution type determination step (S63) of transmitting a portion of the composite-solvent drug sample from the first dissolution chamber 144-1 to the kind determination unit 120 and determining the kind of the drug included in the composite-solvent drug sample, and a liquid sample generation step (S64) of injecting a predetermined amount of a solvent selected based on the kind of the drug determined in the dissolution type determination step into the second dissolution chamber 144-2 to generate a liquid drug sample in which the drug included in the non-liquid drug sample is dissolved and transmitting the liquid drug sample to the base chamber 141.

In the non-liquid sample introduction step (S61), when the user introduces a non-liquid drug sample through the non-liquid introduction port 112 of the sample input unit 110, the non-liquid drug sample is stored in the dissolution chamber 144. In the case in which a plurality of dissolution chambers 144-1 . . . 144-N is provided, the non-liquid drug sample may be stored in the dissolution chambers 144 in a divided state. When a portion of the non-liquid drug sample is stored in the first dissolution chamber 144-1 and the second dissolution chamber 144-2, the next step may be performed.

In the composite solvent introduction step (S62), solvents from the plurality of solvent tanks 143-1 . . . 143-N are transmitted to the dissolution chamber 144 under control of the control unit 160. At this time, the control unit 160 may inject various kinds of solvents into the dissolution chamber 144 to dissolve an arbitrary kind of drug included in the non-liquid drug sample stored in the dissolution chamber 144. When the composite solvent introduction step (S62) is performed, the non-liquid drug sample stored in the dissolution chamber 144 is dissolved in the composite solvent, whereby a composite-solvent drug sample is generated.

The dissolution type determination step (S63) is basically identical to the kind determination step (S12). The control unit 160 transmits a portion of the composite-solvent drug sample stored in the first dissolution chamber 144-1 to the kind determination unit 120, and the kind determination unit 120 screens the kind of the drug included in the composite-solvent drug sample and transmits the result to the control unit 160. The control unit 160 may recognize the kind of the drug or the kind of the solvent suitable for dissolving the drug based on data received from the kind determination unit 120.

In the liquid sample generation step (S64), the non-liquid drug sample is converted into a liquid drug sample. The second dissolution chamber 144-2 may store a portion of the non-liquid drug sample, and the control unit 160 may perform control such that the dilution unit 140 transmits the solvent suitable for dissolving the drug included in the non-liquid drug sample stored in the second dissolution chamber 144-2 to the second dissolution chamber 144-2. The second dissolution chamber 144-2 dissolves the non-liquid drug sample in the solvent to generate a liquid drug sample. The liquid drug sample stored in the second dissolution chamber 144-2 may be transmitted to the base chamber 141 under control of the control unit 160. When the liquid drug sample is transmitted to the base chamber 141, the solvent introduction step (S13), the sensor operation step (S14), the high-concentration determination step (S15), the dilution ratio decision step (S16), and the concentration calculation step (S17) may be performed according to the concentration calculation algorithm.

As described above, the multiple times available drug concentration measuring apparatus and method according to the embodiment of the present invention are capable of measuring the content or concentration of the drug included in the non-liquid drug sample as well as the liquid drug sample.

As is apparent from the above description, according to the embodiment of the present invention, it is possible to use various kinds of drug sensors, whereby it is possible to detect various kinds of drugs and to measure the concentrations of the drugs.

In addition, according to the embodiment of the present invention, in the case in which the output value of the sensor that has measured the liquid drug sample is saturated, the liquid drug sample is repeatedly diluted and the concentration of the liquid drug sample is remeasured, whereby it is possible to backwardly calculate the original concentration of the liquid drug sample before dilution. Consequently, it is possible to measure the concentration of an arbitrary liquid drug sample even in the case in which the concentration of the liquid drug sample exceeds the upper limit of the concentration range that can be measured by the sensors.

In addition, according to the embodiment of the present invention, a replaceable cartridge having a plurality of sensors disposed therein may be used, whereby plenty of measurements are possible using a single cartridge and inspection may be continued by replacing the cartridge on the scene. Furthermore, even in the case in which cartridges manufactured by different manufacturers are used, it is possible to learn the concentration range that can be measured by the sensors by repeatedly testing the sensors, whereby cartridge universality is high. Moreover, the concentration measuring apparatus may record the number of times that the cartridge is used, whereby it is possible to efficiently measure concentration depending on the number of times that the cartridge is used.

Although the present invention has been described in detail with reference to the embodiments, the embodiments are provided to describe the present invention in detail, the present invention is not limited thereto, and the present invention can be modified or improved by a person having ordinary skill in the art to which the present invention pertains within the technical idea of the invention.

Simple modifications and changes of the present invention are to be appreciated as being included in the scope and spirit of the invention, and the protection scope of the present invention will be defined by the accompanying claims.

What is claimed is:

1. A multiple times available drug concentration measuring apparatus comprising:
    a sample input unit configured to allow a liquid drug sample to be introduced therethrough;
    a dilution unit configured to add a solvent to a portion of the liquid drug sample in order to dilute the liquid drug sample;
    a concentration measurement unit configured to measure a concentration of the liquid drug sample, wherein the concentration measurement unit includes a plurality of sensors; and
    a control unit configured to decide a dilution ratio of the liquid drug sample based on data received from the concentration measurement unit, to control the dilution unit to dilute the liquid drug sample according to the dilution ratio, and to calculate a concentration of the liquid drug sample based on the dilution ratio and the data received from the concentration measurement unit,
wherein the control unit is configured to:
determine an upper limit of a concentration range that can be measured by the sensors of the plurality of sensors, and the upper limit of the concentration range is determined by:
    comparing an output value of a first sensor of the plurality of sensors that has measured a standard sample having a first highest concentration with an output value of a second sensor that has measured the standard sample having a second highest concentration which is lower than the first highest concentration;
    comparing the output value of the second sensor with an output value of a third sensor of the plurality of sensory that has measured the standard sample having a third highest concentration which is lower than the second highest concentration;
    in response to determining the sensors of the plurality of sensors are saturated, resetting the concentration of the standard sample so as to have a lower concentration, wherein the sensors of the plurality of sensors are determined to be saturated based on one or more of the output values of the first sensor and the second sensor or the output values of the second sensor and the third sensor being equal to each other; and
    in response to one or more of the output values of the first sensor, the second sensor, or the third sensor being lower than the other sensors of the plurality of sensors, determining the concentration of the standard sample exposed to the sensor of the plurality of sensors having a lower output value as the upper limit of the concentration range that can be measured by the sensors of the plurality of sensors;
determine, based on the data received from the concentration measurement unit whether the concentration of the liquid drug sample exposed to a fourth sensor of the plurality of sensors, exceeds the upper limit of the concentration range;
in response to determining the concentration of the liquid drug sample exposed to the fourth sensor of the plurality of sensors exceeds the upper limit of the concentration range, control the dilution unit to dilute the liquid drug sample exposed to the sensor at a predetermined ratio and the concentration measurement unit to measure the concentration of the diluted liquid drug sample received from the dilution unit using a fifth sensor of the plurality of sensors, and repeats determining whether the concentration of the diluted liquid drug sample exceeds the upper limit of the concentration range, dilution of the liquid drug sample, and measurement of the concentration of the diluted liquid drug sample; and in response to determining the concentration of the liquid drug sample exposed to the fourth sensor of the plurality of sensors is less than or equal to the upper limit of the concentration range, calculate the concentration of the liquid drug that has not been diluted using a dilution ratio obtained as a result of repeated dilution.

2. The multiple times available drug concentration measuring apparatus according to claim 1, wherein the plurality of sensors are disposed in a replaceable cartridge, and the concentration measurement unit exposes a predetermined amount of the liquid drug sample to a selected sensor of the plurality of sensors, operates the selected sensor of the plurality of sensors, and provides data output by the selected sensor of the plurality of sensors to the control unit.

3. The multiple times available drug concentration measuring apparatus according to claim 1, wherein the dilution unit comprises:

a base chamber configured to store the liquid drug sample received from the sample input unit;

a plurality of dilution chambers configured respectively to store liquid drug samples diluted at various ratios as a result of a portion of the liquid drug sample received from the base chamber being repeatedly diluted with the solvent according to the dilution ratio;

a plurality of solvent tanks configured respectively to store various kinds of solvents; and a quantitative pipe configured to connect the base chamber, the dilution chambers, and the solvent tanks to each other and to transmit the liquid drug samples and the solvents in predetermined amounts.

4. The multiple times available drug concentration measuring apparatus according to claim 1, wherein the control unit performs control such that the dilution unit dilutes a standard sample so as to have various concentrations, exposes standard samples diluted so as to have various concentrations to sensors to analyze output values of the sensors, and learns an upper limit of a concentration range that can be measured by the sensors.

* * * * *